(12) United States Patent
Battaglia et al.

(10) Patent No.: US 6,682,255 B2
(45) Date of Patent: Jan. 27, 2004

(54) MODULAR MERCHANDISING DISPLAY CONNECTOR

(75) Inventors: Joseph M. Battaglia, McKinney, TX (US); Stanley Hawkins, Highland Village, TX (US); Reggie Stubblefield, Garland, TX (US)

(73) Assignee: Universal Display & Fixtures Company, Lewisville, TX (US)

( * ) Notice: Subject to any disclaimer, the term of this patent is extended or adjusted under 35 U.S.C. 154(b) by 0 days.

(21) Appl. No.: 09/971,966

(22) Filed: Oct. 4, 2001

(65) Prior Publication Data

US 2002/0110408 A1 Aug. 15, 2002

Related U.S. Application Data (60) Provisional application No. 60/237,990, filed on Oct. 5, 2000.

(51) Int. Cl.[7] .................................................. F16B 5/00
(52) U.S. Cl. ........................................ 403/381; 403/331
(58) Field of Search ............................... 403/170, 217, 403/230, 331, 169, 381, 366, 175, 178

(56) References Cited

U.S. PATENT DOCUMENTS

| | | | |
|---|---|---|---|
| 2,854,103 A | 9/1958 | Kruger | |
| 3,186,561 A | 6/1965 | Strässle | |
| 3,966,342 A | 6/1976 | Moriya | |
| 4,101,231 A | 7/1978 | Streib | |
| 4,455,103 A | 6/1984 | Hackenberg | |
| 4,490,064 A | 12/1984 | Ducharme | |
| D277,727 S | 2/1985 | Klaric | |
| 4,652,170 A | 3/1987 | Lew | |
| 4,689,929 A | 9/1987 | Wright | |
| 5,277,512 A | 1/1994 | Dwillies | |
| 5,315,805 A | 5/1994 | Harsch | |
| D372,419 S | 8/1996 | Ikegami | |
| 5,647,650 A | 7/1997 | Daugherty et al. | |
| 5,651,630 A | 7/1997 | Nomura | |
| 5,683,197 A | 11/1997 | Pihl | |
| 5,746,535 A * | 5/1998 | Kohler | 403/230 X |
| 5,791,806 A | 8/1998 | Giehl | |
| 5,901,859 A | 5/1999 | Carr et al. | |
| 6,179,511 B1 * | 1/2001 | Gassler | 403/189 X |

* cited by examiner

Primary Examiner—John R. Cottingham
(74) Attorney, Agent, or Firm—Haynes and Boone, LLP.

(57) ABSTRACT

A connector is described comprising a longitudinally extending central portion, a plurality of planar walls, radially extending from the central portion, and a plurality of hammer-shaped members interposed between the walls, and radially extending from the central portion. An asymmetrical channel is defined between each of the walls and the members for retaining inserts.

17 Claims, 8 Drawing Sheets

MODULAR MERCHANDISING DISPLAY CONNECTOR

This application claims priority from provisional application Ser. No. 60/237,990, filed on Oct. 5, 2000.

This invention relates to a connector for receiving inserts, and for use with a modular merchandising display.

BRIEF DESCRIPTION OF THE DRAWINGS

FIG. 4b is a top plan view of FIG. 4a.

FIG. 6b is a top plan view of FIG. 6a.

DETAILED DESCRIPTION

Figure 1A:
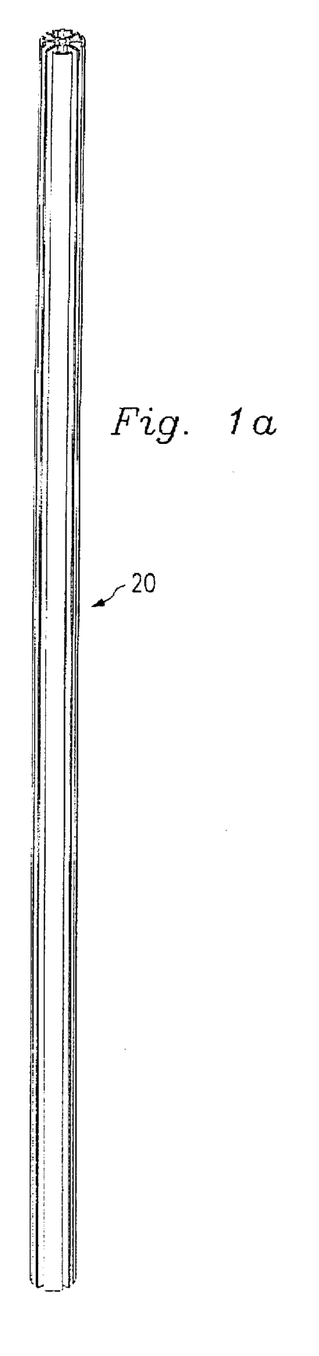
FIG. 1a is a perspective view of a connector according to one embodiment of the present invention.
Figure 1B:
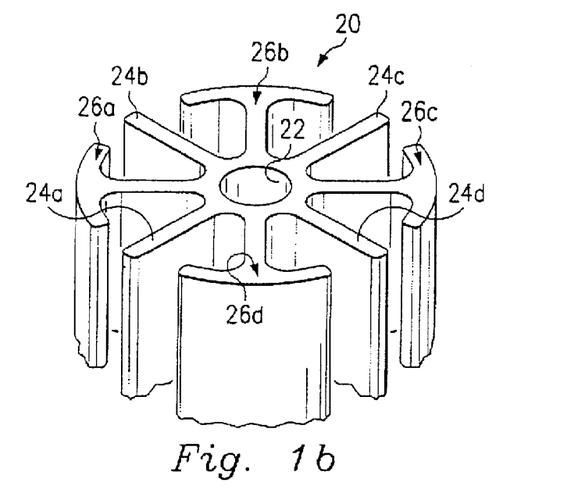
FIG. 1b is an enlarged broken away perspective view of the connector.
Figure 1C:
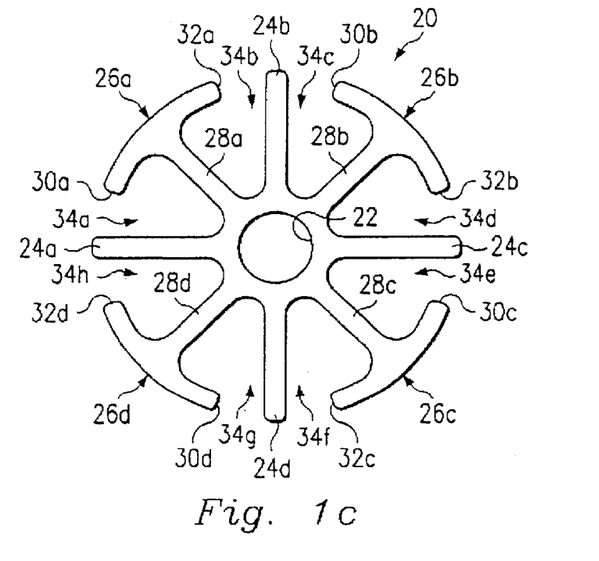
FIG. 1c is a top plan view of the connector.

FIGS. 1a–c illustrate an elongated connector 20 for receiving various inserts, as will be described. As shown in FIG. 1b, the connector 20 has a substantially tube-shaped central portion 22 running through its longitudinal axis. Four generally planar radial walls 24a–d extend from the central portion 22 of the connector. As the walls are substantially identical, they are referred to generally by the reference numeral 24. This numbering convention of omitting the alphabetical portion of the reference numeral while discussing the feature generally will be used throughout the specification.

Four radially-extending hammer-shaped members 26a–d also extend from the central portion 22, and are interposed between the walls 24. Each of the hammer-shaped members 26 has a generally planar wall 28 which connects to the central portion 22. At the distal end of the wall 28, a counterclockwise-oriented hook 30 and a clockwise-oriented hook 32 are each disposed. It is understood that in FIGS. 1b–c, the suffixes a–d are applied to the walls 28 and hooks 30 and 32 to indicate which features correspond with the respective hammer-shaped members 26a–d.

As shown in FIG. 1c, the walls 24 and the hammer-shaped members 26 cooperate to define eight channels 34a–h. It is understood that the number of walls and hammer-shaped members depicted is merely illustrative, and hence the number of channels is also merely illustrative. Each channel 34 has a flat side defined by the surface of the radial wall 24, and a hook side, defined by the surface of the hammer-shaped member 26. Thus, each channel 34 is asymmetrical. By virtue of its asymmetrical channels 34, the connector 20 is adapted to receive and retain a variety of inserts, as will be described with reference to the following Figures.

Figure 2:
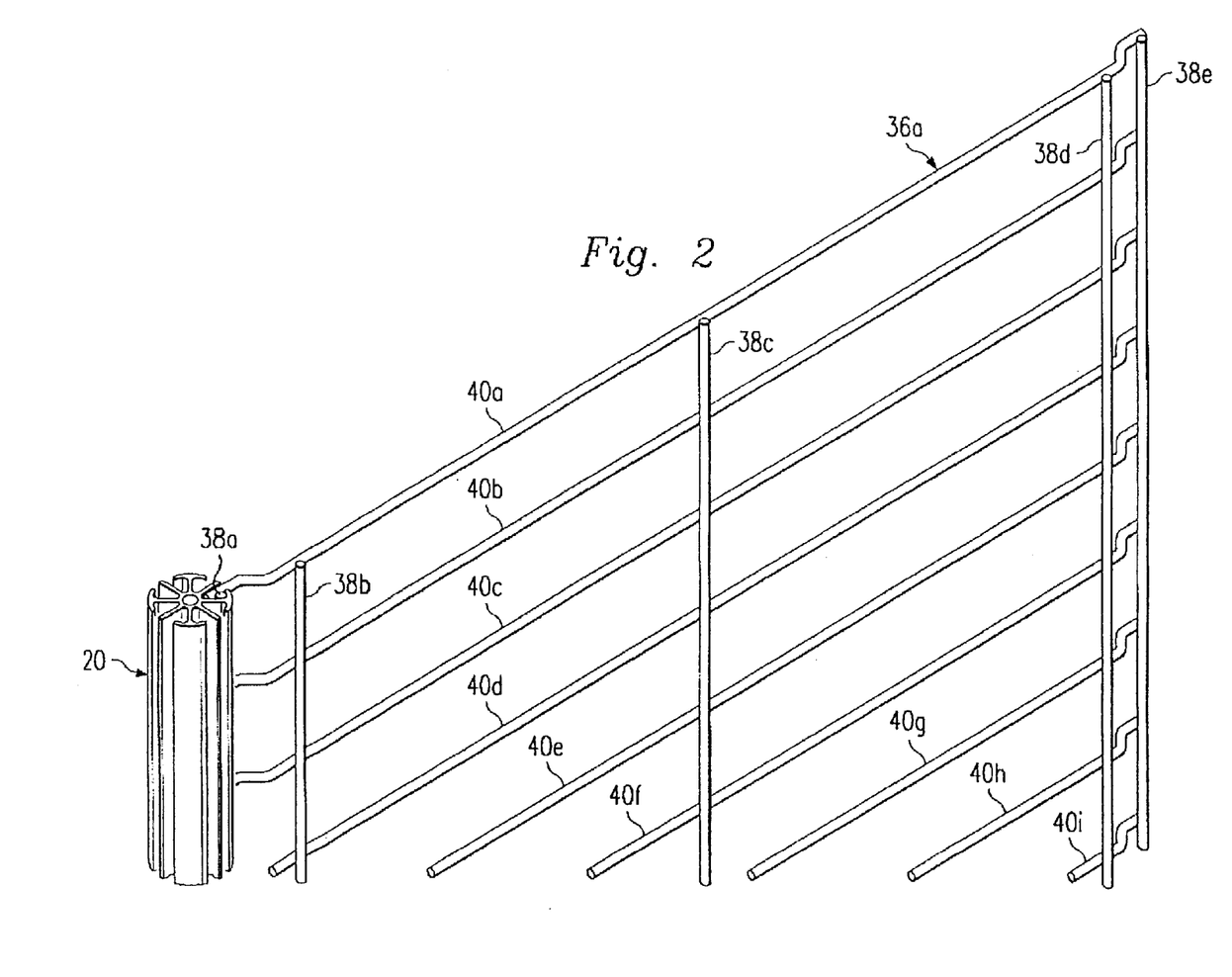
FIG. 2 is a perspective view of the connector retaining a side grid.

FIG. 2 depicts the connector 20 retaining a side grid 36a. The side grid 36a may be made of any conventional material, such as an appropriate gauge, or gauges, of wire. The side grid 36a comprises a plurality of vertical bars 38a–e and a plurality of horizontal bars 40a–i. As will be described in greater detail with respect to FIGS. 6a–b, a proximal vertical bar, such as 38a of the side grid 36a, is inserted into one of the channels 34 of the connector 20. The connector 20 prevents the vertical bar 38a from exiting the channel 34 in a radial direction relative to the connector's longitudinal axis, thus connecting the connector and side grid 36a.

In operation, the vertical bar 38a is inserted longitudinally into the channel 34 so that the vertical bar is adjacent to the hook side of the channel. Thus, the hook 30 of the connector 20 engages the vertical bar 38a, and prevents the side grid 36a from exiting the channel 34 in a radial direction. It is understood that the vertical bar 38e may be inserted in the connector 20 instead of the vertical bar 38a, or alternatively, the vertical bar 38e may be inserted into a second connector 20 (not shown).

Figure 3:
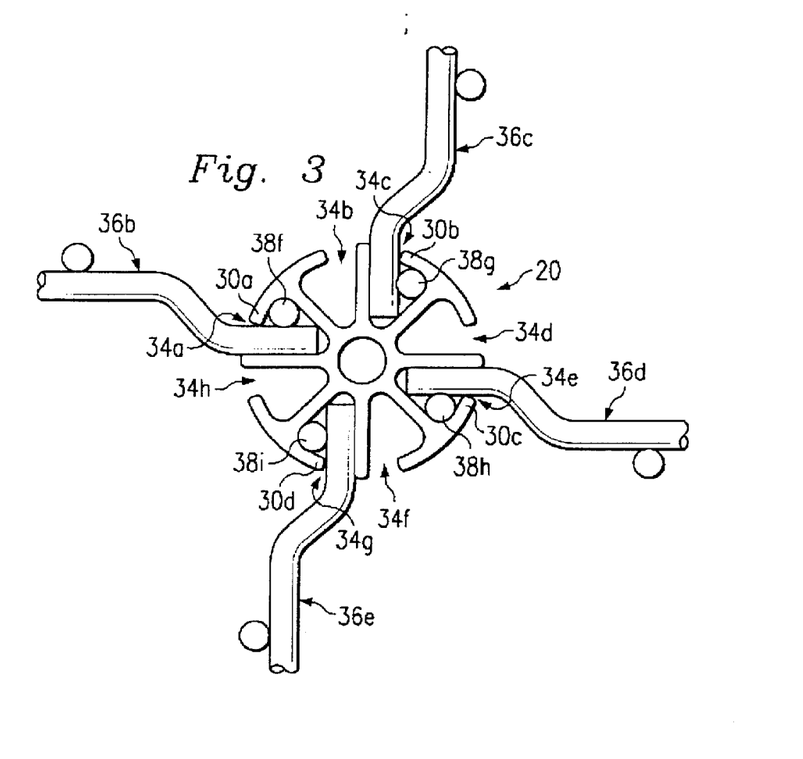
FIG. 3 is an enlarged broken away top plan view of the connector retaining a plurality of side grids.

FIG. 3 depicts the connector 20 retaining a plurality of side grids 36b–e substantially similar to the side grid 36a described in FIG. 2. As shown, the side grids 36b–e each have at least one proximal vertical bar 38f–i, substantially similar to either of the vertical bars 38a or 38e of FIG. 2. The vertical bars 38f–i of the respective side grids 36b–e are retained in channels 34a, 34c, 34e, and 34g of the connector 20 so that the vertical bars are adjacent to the hook side of the channels, retaining the side grids in a radial direction. In this configuration, the side grids 36 are extending from the connector 20 at approximately ninety degree intervals.

Figure 4A:
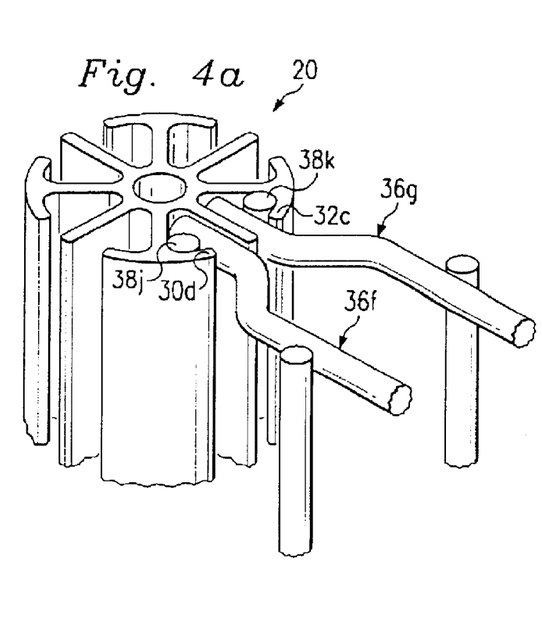
FIG. 4a is an enlarged broken away perspective view of the connector retaining a pair of side grids.
Figure 4B:
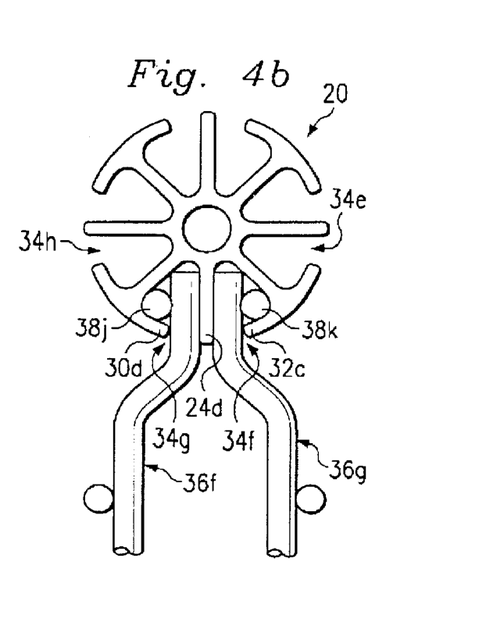

FIGS. 4a–b depict the connector 20 retaining a plurality of side grids 36f–g substantially similar to the side grid 36a described in FIG. 2. As shown, the side grids 30f–g each have at least one proximal vertical bar 38j–k. The vertical bars 38j–k are inserted longitudinally in channels 34f and 34g (FIG. 4b) of the connector 20 so that the vertical bars are adjacent to the hook side of the channels, i.e., the hook 30d of the connector 20 engages the vertical bar 38j, and the hook 32c engages the vertical bar 38k. As noted above, the hooks prevent the respective side grids 36 from exiting the channels 34 in a radial direction. In this configuration, the side grids 36 are extending generally parallel from the connector 20.

As illustrated by the foregoing Figures, the connector 20 can receive one or more side grids 36, which is beneficial for creating various configurations of side grids. As will be discussed now with reference to FIG. 5, the connector 20 enables modular connection of side grids 36.

Figure 5:
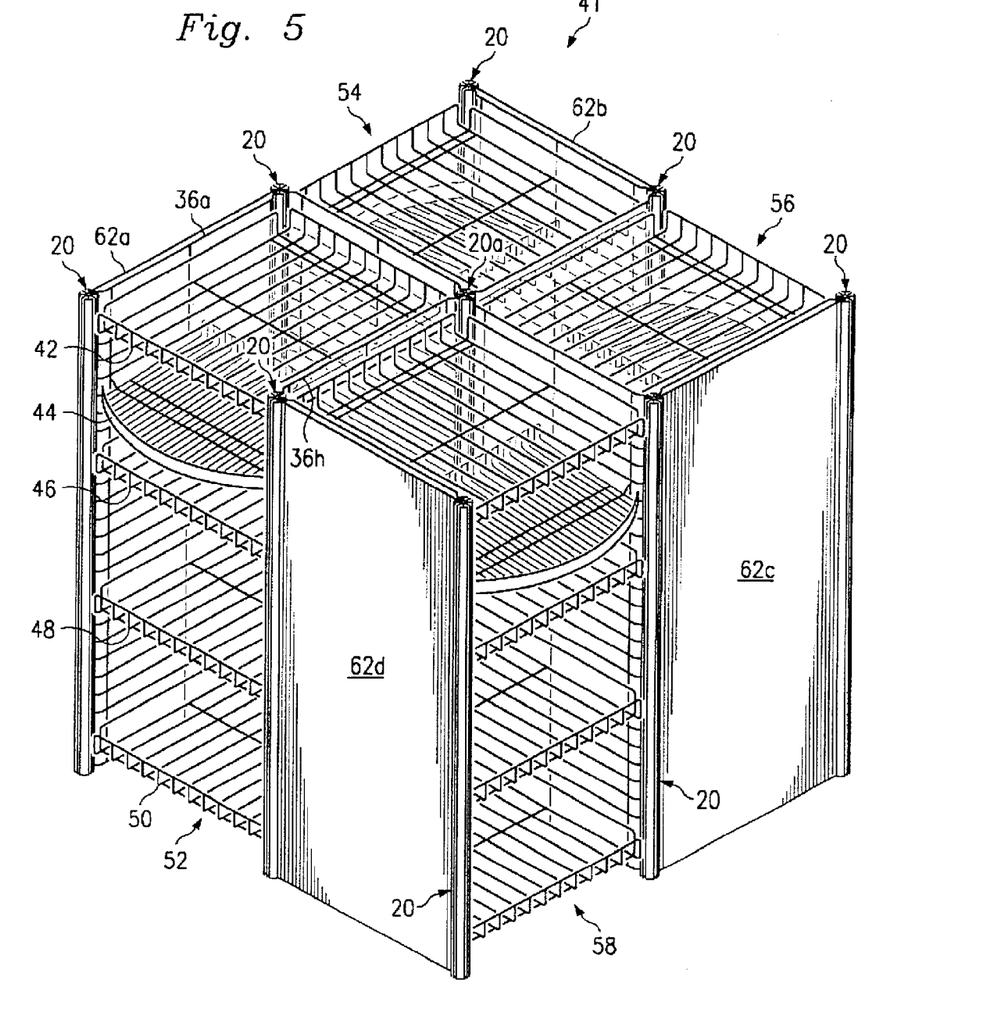
FIG. 5 is a perspective view of a modular merchandising display incorporating a number of connectors of the present embodiment.

Referring to FIG. 5, a set of connectors 20 are used with side grids 36 to create a merchandising display 41. The side grid 36a has connectors 20 attached at each vertical edge in a manner described with respect to FIG. 2. A side grid 36h also has connectors 20 attached at each vertical edge. The side grids 36a and 36h are linked together with shelves 42, 44, 46, 48, and 50.

The shelves 42, 44, 46, 48, and 50 are used for receiving and displaying goods. Taken together, the linked side grids 36a and 36h and shelves 42, 44, 46, 48, and 50 form a self-supporting shelving unit 52.

A central connector 20a is used in a manner described with reference to FIG. 3 to connect the shelving unit 52 to substantially similar shelving units 54, 56, and 58, creating the display 41. Thus, the display 41 is modular.

The channels 34 of the connectors 20 also allow the display 41 to receive and retain panels 62a–d for receiving graphics or advertising material. The panels 62 may display source-identifying information related to the goods, or the retailer, or other information.

As depicted in FIG. 5, four shelving units 52, 54, 56, and 58 are connected together, however, it can be appreciated that any number of modular merchandising displays could be achieved by inserting side grids 36 into the channels 34 of the connectors 20 in different configurations. For example, inserting side grids into a connector in the manner of FIG. 4, and then adding shelves and two distal side grids creates a set of side by side shelving units.

Figure 6A:
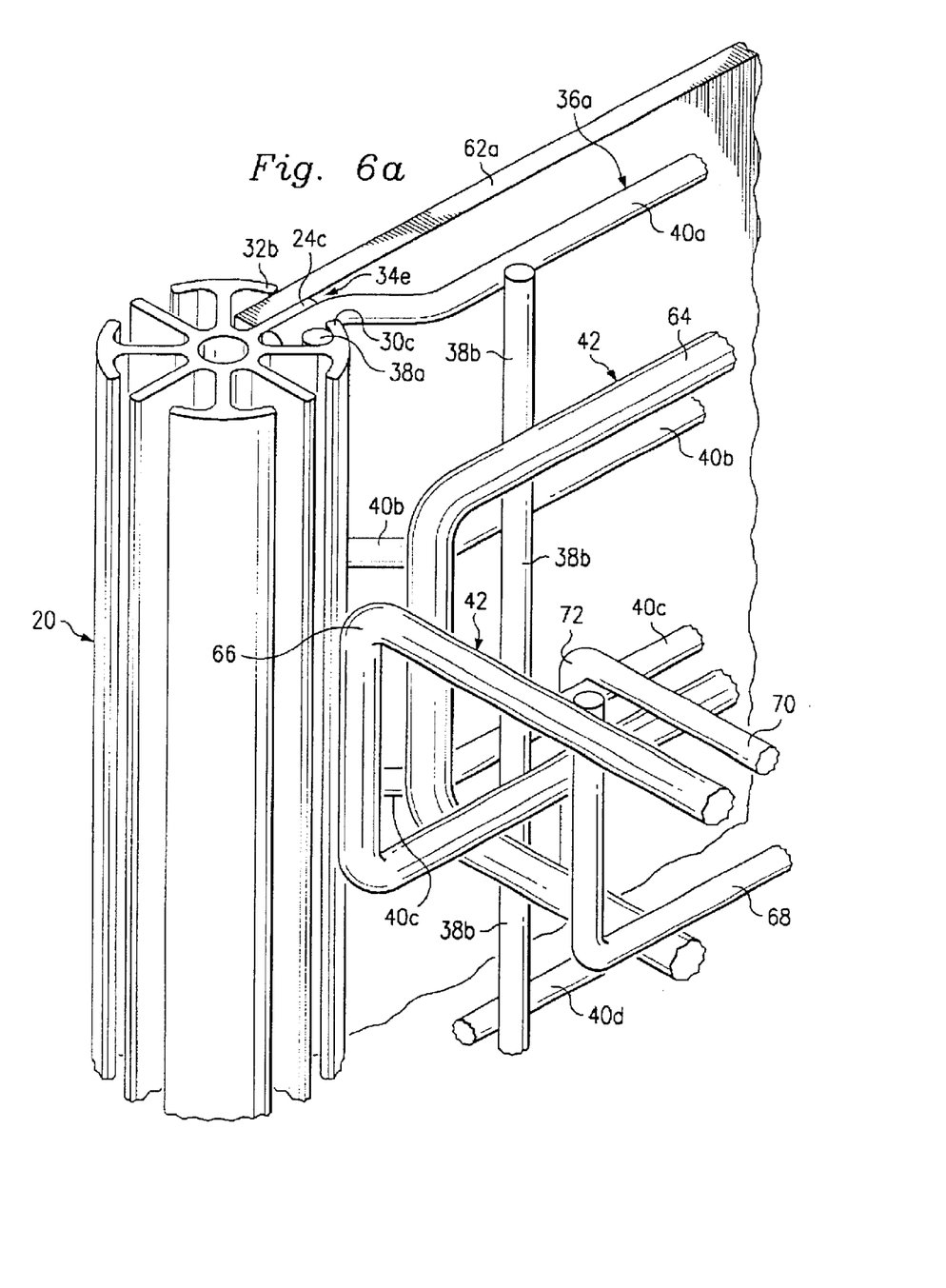
FIG. 6a is an enlarged broken away perspective view of the modular merchandising display.
Figure 6B:
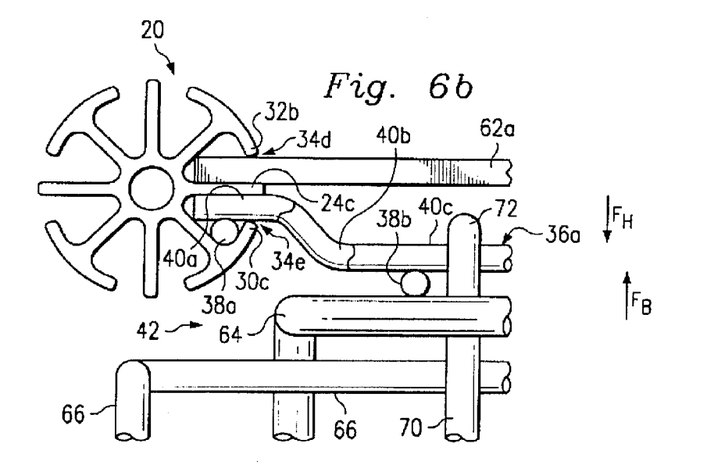

Referring to FIGS. 6a–b, and using shelving unit 52 (FIG. 5) as an example, in operation a side grid, such as side grid 36a (FIG. 2), is inserted longitudinally into the channel 34e of the connector 20 so that the vertical bar 38a is adjacent to the hook side of the channel. Thus, the vertical bar 38a is retained by hook 30c in a radial direction, as previously described. When coupled with a shelf, such as shelf 42, the side grid 36 is also retained in a longitudinal direction.

As mentioned above, the shelf 42 is one of the shelves used to link the side grid 36a to the side grid 36h (FIG. 5). The shelf 42 has a lateral bar 64 which is depicted adjacent to the vertical bar 38b. The lateral bar 64 is connected to a front bar 66. At least one connecting bar 68 is interposed between the lateral bar 64 and the front bar 66, and provides structure for retaining goods on the shelf 42.

The shelf 42 also has a hook bar 70, terminating in a hook 72. The hook 72 engages the side grid 36a. FIG. 6b shows the horizontal bars 40a and 40b broken away to reveal the horizontal bar 40c. As shown, the hook 72 is engaged with horizontal bar 40c.

In one embodiment, the hook 72 is formed at a length sufficiently short to create a bind between the lateral bar 64 and the vertical bars 38. Thus, in the plane defined by the side grid 36a, the vertical bars 38 experience a bind force (denoted $F_B$) in a direction generally outward from the shelf 42. Contrariwise, the horizontal bar 40c experiences a hook force (denoted $F_H$) in a direction generally toward the shelf 42. It can be appreciated that these competing forces $F_B$ and $F_H$ in different locations on the side grid 36a will result in minor distortion of the side grid generally. The distortion of the side grid 36a generally is evident in a distortion of the vertical bar 38a. As the vertical bar 38a distorts, some portions of the vertical bar press against the flat side of the channel 34e and some portions of the vertical bar press against the hook side, thus locking the side grid 36a in the channel in a longitudinal direction. The longitudinal retention is in addition to the previously described radial direction retention. The longitudinal locking of the side grid 36a in the connector 20 may be unlocked by removing the shelf 42.

The panel 62a is inserted into the channel 34d of the connector 20. In one embodiment, the panel 62a is of a deformable material of a predetermined thickness, such that upon insertion of the panel 62a in the channel 34d, the panel is partially compressed by hook 32b. Thus, the panel 62a is retained in the connector 20, and restricted from radial movement. Additionally, the distance between the connectors 20 retaining the panel 62a is fixed by virtue of their attachment to the side grid 36. Thus, the panel 62a is retained between connectors 20.

Figure 7:
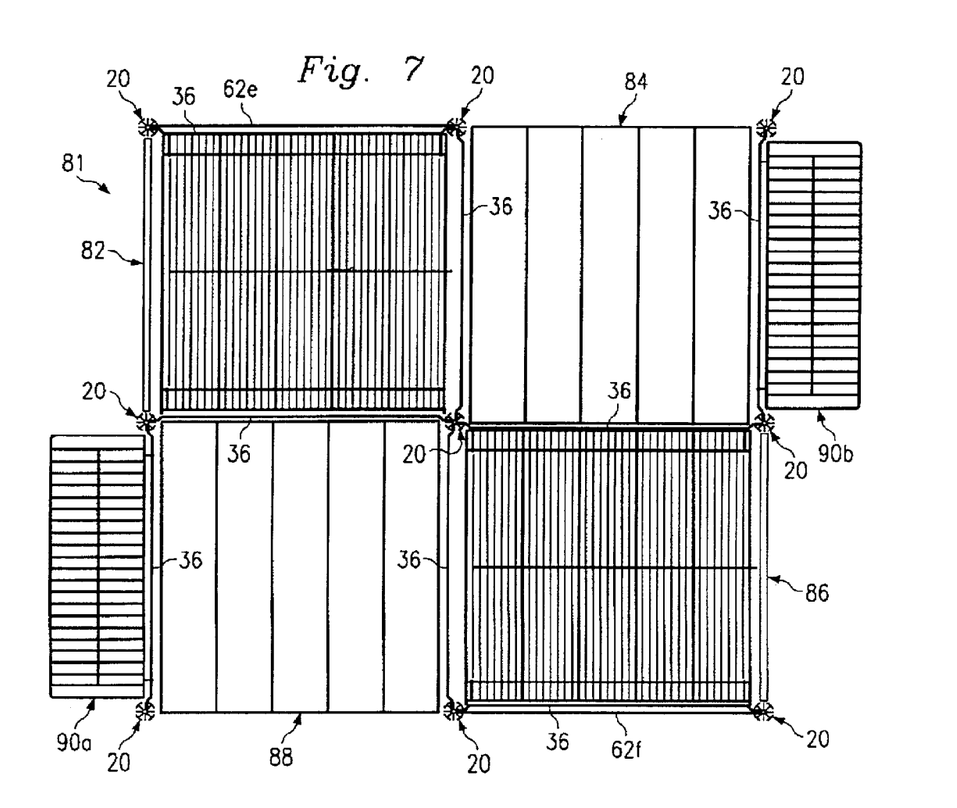
FIG. 7 is a top plan view of an alternative embodiment of a modular merchandising display incorporating a number of connectors of the present embodiment.

Referring now to FIG. 7, an alternative merchandising display 81 is depicted. The display 81 uses connectors 20, side grids 36, and panels 62e–f, in a manner previously described with reference to the foregoing Figures. The display 81 comprises shelving units 82, 84, 86, and 88 for receiving and displaying goods. The shelves may be similar to the shelves 42, 44, 46, 48, and 50, or shelves as will be described with reference to FIGS. 9 and 10. Merchandise baskets 90a–b are disposed on the exterior of the display 81.

Figure 8:
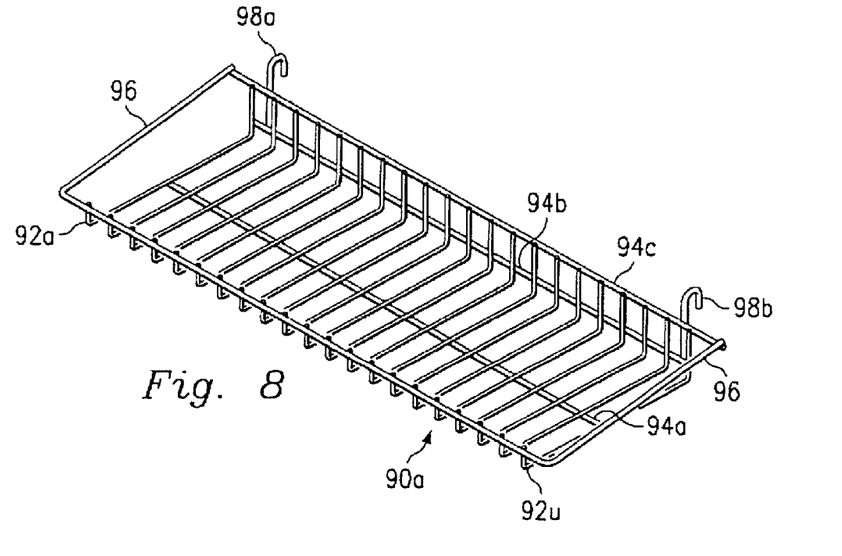
FIG. 8 is a perspective view of a merchandise basket.

Referring to FIG. 8, the basket 90a comprises a plurality of lateral bars 92a–u. The lateral bars 92a–u are attached to connecting bars 94a–c. A U-shaped front bar 96 is connected to the connecting bar 94c and the lateral bars 92. Together the bars 92, 94, and 96 define the basket 90a. The basket 90a has hooks 98a–b for attaching the basket to a side grid 36 (FIG. 7). It is understood that the basket 90b is substantially the same as the basket 90a.

Figure 9:
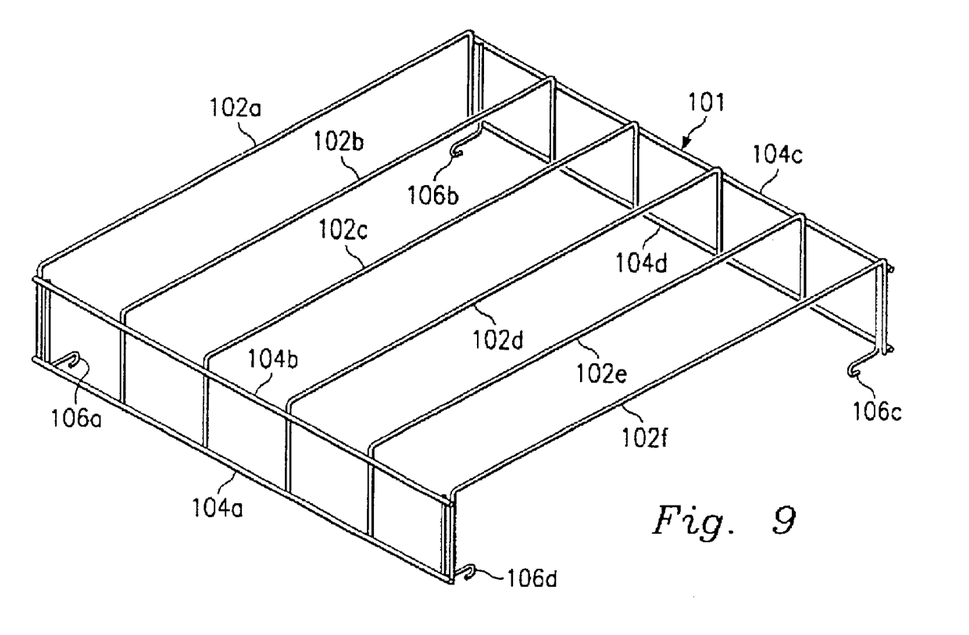
FIG. 9 a perspective view of a divider.
Figure 10:
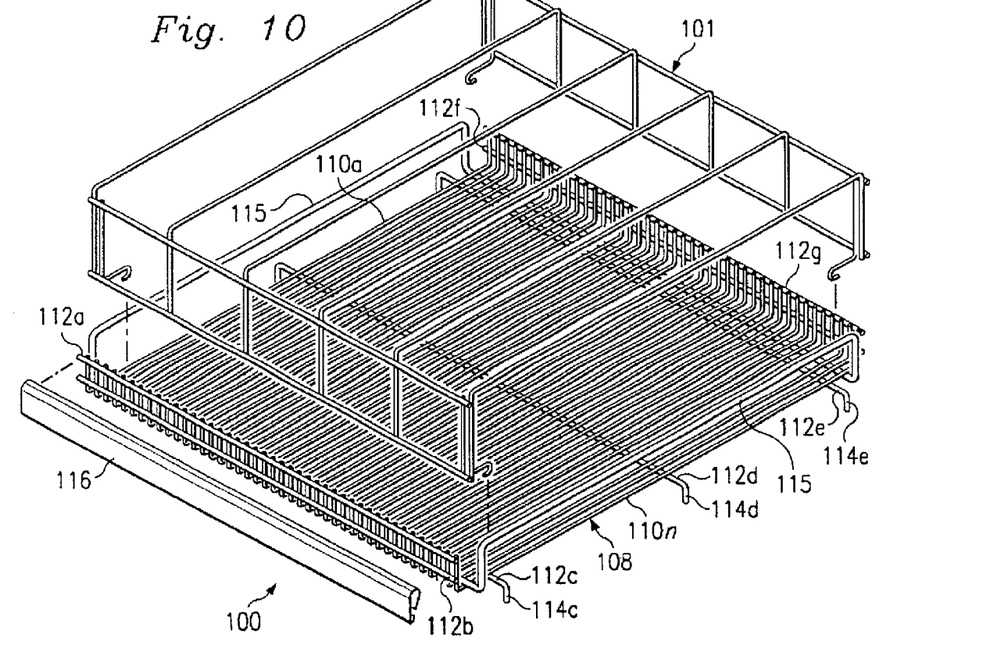
FIG. 10 is an exploded perspective view of a bottom frame, a point of sale indicator, and the divider.

Referring to FIGS. 9 and 10, the shelving units 82, 84, 86, and 88 are defined by a plurality of shelves, for example, shelf 100. The shelf 100 has a divider 101. As shown in FIG. 9, the divider 101 comprises a plurality of lateral bars 102a–f connected by connecting bars 104a–d. Hooks 106a–d are disposed on the divider 101 for connecting the divider to a bottom frame 108 (FIG. 10).

The bottom frame 108 comprises a plurality of lateral bars 110a–n connected by connecting bars 112a–g. The connecting bars 112c–e terminate in hooks 114c–e.

In operation, the hooks 114c–e engage the side grids 36 in a manner similar to that described with reference to FIGS. 6a–b. A side bar 115 is used to engage and distort the side grids 36 (FIG. 7), similar to lateral bar 64 (FIG. 6a). A point of sale indicator 116 may be attached to the bottom frame 108 for displaying information about the goods.

Figure 11:
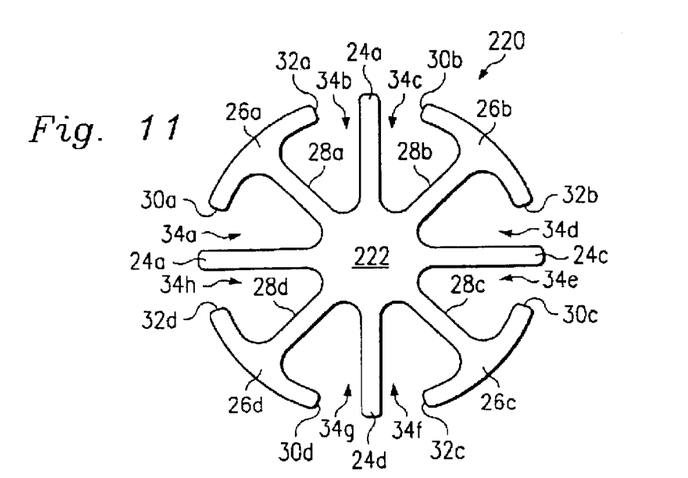
FIG. 11 is a top plan view of a connector according to another embodiment of the present invention.

FIG. 11 illustrates an alternative embodiment of a connector, denoted 220. This embodiment enjoys some the features of the previous embodiment, and these features retain the same reference numerals. In this embodiment, the radial walls 24a–d, and radially-extending hammer-shaped members 26a–d, extend from a solid core 222, instead of the central portion 22 described with reference to FIGS. 1a–c.

It is understood that all spatial references, such as vertical, horizontal, radial, and lateral are only for the purposes of explanation of the drawings. This disclosure shows and describes illustrative embodiments, however, the disclosure contemplates a wide range of modifications, changes, and substitutions. Such variations may employ only some features of the embodiments without departing from the scope of the underlying invention. Accordingly, any appropriate construction of the appended claims will reflect the broad scope of the underlying invention.

What is claimed is:

1. A connector for detachably retaining an insert, the connector comprising:
    a central portion;
    a first planar wall extending from the central portion, the first wall having no protrusions at its distal end;
    a hammer-shaped second wall extending from the central portion, the first and second walls defining an asymmetrical channel between them, such that the insert is engaged by the hammer-shaped wall when the insert is disposed in the channel, thereby retaining the insert from movement in a first direction.
2. The connector of claim 1 further comprising means for distorting the insert when the insert is disposed in the channel, thereby retaining the insert from movement in a second direction perpendicular to the first direction.

3. The connector of claim 1 wherein the insert is a side grid.

4. The connector of claim 1 wherein the insert is a panel.

5. A method for retaining an insert, comprising:
providing a first planar wall, the first wall having no protrusions at its distal end;
providing a hammer-shaped second wall to define an asymmetrical channel between the first and second walls, such that the insert is engaged by the hammer-shaped wall when the insert is disposed in the channel, thereby retaining the insert from movement in a first direction; and
distorting the insert when the insert is disposed in the channel, thereby retaining the insert from movement in a second direction perpendicular to the first direction.

6. A connector, comprising:
a longitudinally extending central portion;
a plurality of planar walls, radially extending from the central portion, the planar walls having no protrusions at their distal ends;
a plurality of hammer-shaped members interposed between the walls, and radially extending from the central portion.

7. The connector of claim 6 wherein an asymmetrical channel is defined between each of the walls and the members.

8. The connector of claim 6 wherein each of the members comprises a wall connected to the central portion and a distally extending hook portion.

9. A shelving unit comprising: a pair of side grids; a shelf extending between the side grids, and exerting a force on the side grids that the side grids are distorted in a first direction; a plurality of connectors removably attached to the side grids the connectors being locked to the side grids by the force exerted by the shelf.

10. The shelving unit of claim 9 further comprising a panel disposed between the connectors.

11. The shelving unit of claim 10 wherein the connectors define channels for receiving the walls and the panel.

12. A connector assembly, comprising:
a connector comprising:
a central portion;
a first wall extending radially from the central portion; and
a second wall extending radially from the central portion, the first and second walls
defining an asymmetrical channel there between; and
an insert disposed in the channel, the insert comprising a first bar having a generally circular cross section extending parallel to and in engagement with the first wall, and a second bar having a generally circular cross section extending in a plane perpendicular to the plane of the first bar and engaging the second wall to retain the insert in the channel.

13. The connector assembly of claim 12 wherein the insert is retained from movement in a first direction.

14. The connector assembly of claim 13 further comprising a shelf for engaging and distorting the insert, thereby retaining the insert from movement in a second direction perpendicular to the first direction.

15. The connector assembly of claim 12 wherein the first bar and the second bar are integrally formed.

16. The connector assembly of claim 12 wherein the second wall comprises a radial portion and a curved portion at the distal end of the radial portion.

17. The connector assembly of claim 16 wherein the second bar engages an inner surface of the curved portion of the second wall.

* * * * *